Sept. 20, 1949.  V. MASTROMARINO  2,482,630
AUTOMOBILE CURB GUIDE
Filed Aug. 7, 1947
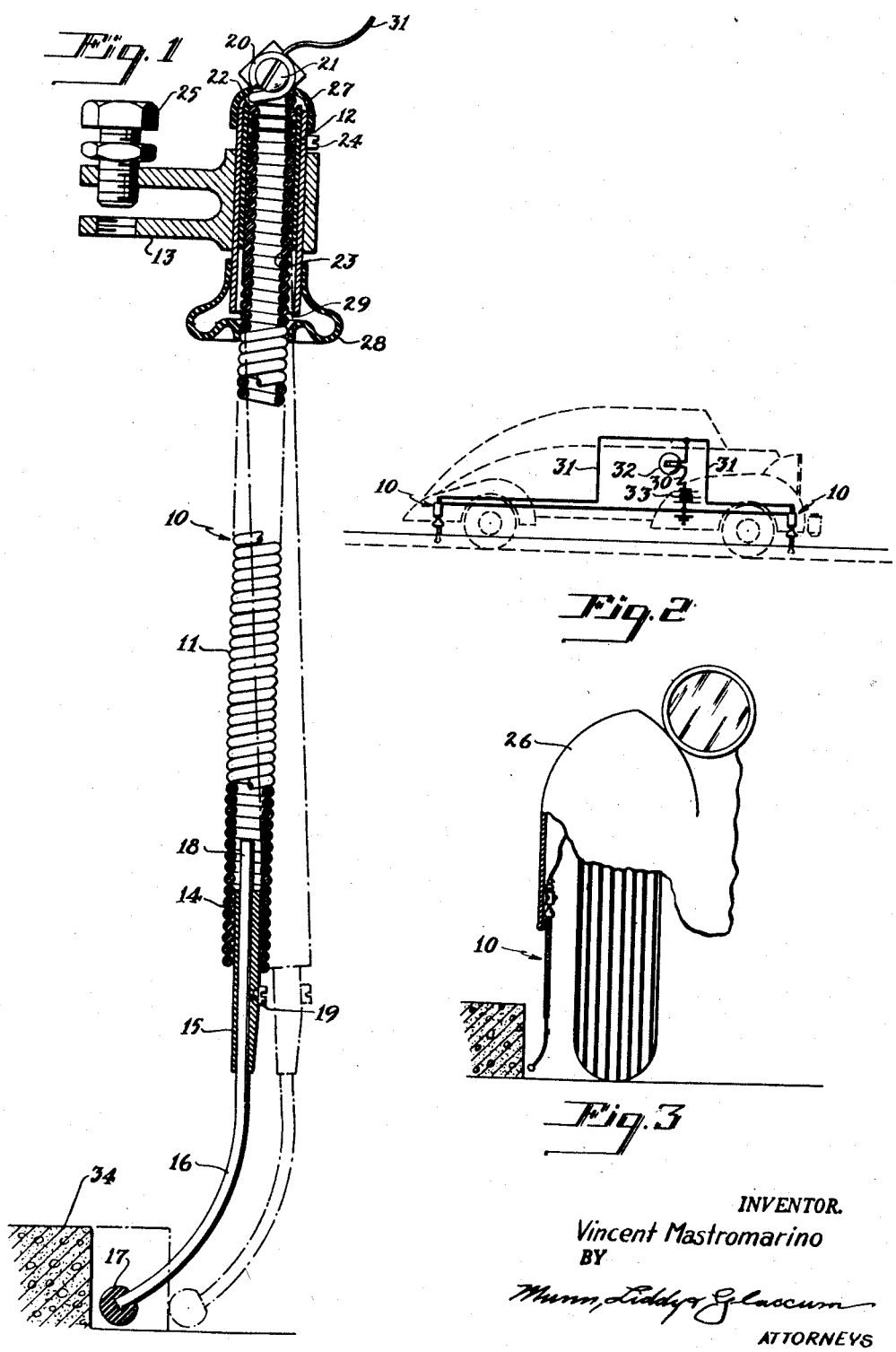
INVENTOR.
Vincent Mastromarino
BY
ATTORNEYS Patented Sept. 20, 1949

2,482,630

UNITED STATES PATENT OFFICE 2,482,630

AUTOMOBILE CURB GUIDE

Vincent Mastromarino, New York, N. Y.

Application August 7, 1947, Serial No. 766,925

2 Claims. (Cl. 200—52)

My invention relates to indicating devices and, more particularly, to an automobile curb guide that provides a visual indication to the driver when the automobile is in proximity to the curb or other obstructions.

Today, with automobiles of modern design, it becomes increasingly difficult for the operator of an automobile to be able to accurately determine the position of the body and tires of the automobile relative to the curb. Obviously, for many reasons, it is more desirable to avoid hitting the curb when parking, for such an action often results in split tires or, where the vehicle is of a particularly low design, of scraped fenders or running boards.

My principal objective was to avoid these difficulties by providing for the driver a visual indicating device on the dash board that would notify him when the automobile was in close proximity to the curb. In accomplishing my aims, I have designed and constructed a curb guide that is simple, and efficient in its operation and one which may be readily attached to the fenders or frame of an automobile. My device consists of a flexible member with a contact element mounted at the lower end thereof, the upper portion of the flexible member being supported and secured to the fender of an automobile and so constructed that when the contact member strikes an object, an electrical circuit will be energized causing a signaling device on the dash board of an automobile to operate.

A further advantage of my device is that due to the novel construction of the flexible arm, it will immediately return to its normal position as soon as the contact element has moved away from the curb or other object.

Another feature of my device is the incorporating of adjustable means on the contact element that enables the operator to control the distance from the ground at which he desires the device to function.

Further advantages and unique features of my device will be apparent as I proceed with the description.

With reference to the drawings—

Fig. 1 shows a vertical section through my device;

Fig. 2 shows my device mounted on the front and rear fenders of an automobile along with associated wiring; and Fig. 3 shows my device secured to the front fender of an automobile.

In Fig. 1, I show my automobile curb guide 10 whose principal parts consist of a flexible spring arm 11, a sleeve member 12 and a support bracket 13.

The spring arm 11, in its preferred form, is composed of an elongated tightly wound resilient coil spring that will be suspended in a vertical position when mounted on the fender or frame of the automobile. The lower portion 14 of the spring arm 11 serves as a housing for a chuck member 15 that is held in place through the tension exerted by the coils of the spring arm 11. Adjustably positioned in the chuck 15 is an arcuate shaped wire member 16 which is equipped with a ball shaped contact element 17 on its lower extremity. The upper portion 18 of the wire member 16 is held in the chuck 15 by adjusting screw 19 which also allows the operator to vertically adjust the position of the contact element 17 relative to the ground. The lower portion of the wire member 16 curves outwardly and projects beyond the side of the automobile with the contact element 17 in position to contact any obstruction, such as a curb. Normally, the contact element 17 would be adjusted to a point three to four inches above the ground in order that it might be in position to contact curbs of normal height.

Secured to the extreme upper portion 20 of the spring arm 11 is a nut and bolt assembly 21 that constitutes one of the terminals for the electrical circuit. Positioned around approximately the upper fourth of the spring arm 11 is a sleeve 12. The sleeve 12 is spaced from the spring arm 11 and positioned between the arm 11 and the sleeve 12 is an insulated bushing 22. The bushing 22 is approximately two-thirds the length of the sleeve 12 and is positioned in such a manner that the upper edge of the bushing 22 extends above the upper edge of the sleeve 12. The function of the bushing 22 is to center the upper portion 23 of the arm 11 in the sleeve 12 so that in normal position they are spaced from each other. A locking screw 24 is provided which holds the upper portion of the bushing 22 and prevents it from slipping out of the sleeve 12.

Integral with or secured to the sleeve member 12 through any suitable means is a support bracket 13 which has a clamping member 25 at its opposite end by which the device 10 may be mounted to the fender 26 or frame of an automobile. It is preferable to mount the device on both the right front and rear fenders of an automobile in such a manner that the spring arm is suspended vertically with the lower portion of the arcuate shaped wire member projecting toward the curb.

Mounted over the top of the sleeve 12 is a sealing cup 27 which may be made of rubber or any other suitable material. Likewise, the lower portion of the sleeve 12 is surrounded by another sealing cup 28 to prevent dirt or other matter from penetrating up into the sleeve 12.

Figure 2 shows a schematic view of the wiring diagram associated with my device 10 and it will be noted that, as indicated, one of my devices can be mounted on the right front fender and the other on the right rear fender of an automobile and wired in such a manner that when either one contacts an obstruction, the signaling unit will operate. The devices may be wired into the ignition system of a conventional automobile so that when the ignition switch 30 is open and the automobile is idle, the electrical circuit will not be energized. In completing the electrical circuit, the wire 31 is connected to the upper terminal 21 of the device 10 and the other end of the wire 31 is connected to a suitable signaling unit such as a bulb or buzzer 32 that may be mounted on the dash board of an automobile. The other side of the signaling unit is connected to the ignition switch 30 and then to the battery 33. As the opposite terminal of the battery is grounded by being connected to the frame of an automobile and the devices are also grounded by being connected to the frame of an automobile through the bracket 13, the electrical circuit is completed by these connections.

To operate my device 10, the automobile is directed toward the curb 34 and as the contact element 17 touches the curb 34, the spring arm 11 will be deflected inward toward the automobile as shown by the dotted lines in Fig. 1. When the flexible spring arm 11 takes this position, the upper portion 23 of the arm, at point 29, contacts the sleeve 12 thereby completing the electrical circuit and causing the signaling unit 32 to operate. As the signaling unit 32 indicates to the operator the nearness of the automobile to the curb 34, he will then maneuver the automobile away from the curb 34 causing the resilient spring arm 11 to regain its normal vertical position and thereby break the contact at point 39 resulting in the signaling unit 32 being de-energized.

It can be readily seen that my device will be of great assistance to operators of automobiles especially in those cases when the automobile is being backed into a parking position parallel to the curb.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. In a curb indicating device, a metal sleeve, a coiled spring element within said metal sleeve and spaced therefrom and extending below said metal sleeve, an insulating sleeve between said coiled spring element and the upper portion of said metal sleeve, the deflection of the lower end of said coiled spring element causing it to contact the lower portion of said metal sleeve, a hollow chuck disposed in the lower end of said coiled spring element, a curved curb-engaging member adjustably disposed in said chuck, the lateral deflection of the spring element being caused by contact of the curb-engaging member with the side of a curbing.

2. In a curb indicating device, a metal sleeve, a coiled spring element within said metal sleeve and spaced therefrom and extending below said metal sleeve, an insulating sleeve between said coiled spring element and the upper portion of said metal sleeve, the deflection of the lower end of said coiled spring element causing it to contact the lower portion of said metal sleeve, a hollow chuck disposed in the lower end of said coiled spring element, a curved curb-engaging member adjustably disposed in said chuck, the lateral deflection of the spring element being caused by contact of the curb-engaging member with the side of a curbing, a sealing cup of insulating material around the bottom of the metal sleeve and sealingly surrounding the coiled spring below the bottom of the sleeve to protect the lower end of the sleeve and the inclosed portion of the spring from dirt, dust and the weather.

VINCENT MASTROMARINO.

REFERENCES CITED

The following references are of record in the file of this patent:

UNITED STATES PATENTS

| Number | Name | Date |
| --- | --- | --- |
| 1,883,040 | Solve | Oct. 18, 1932 |
| 2,144,286 | Dawson | Jan. 17, 1939 |
| 2,208,697 | Kernodle et al. | July 23, 1940 |
| 2,259,614 | Chang | Oct. 21, 1941 |
| 2,270,687 | Morse | Jan. 20, 1942 |
| 2,302,283 | Yarnall | Nov. 17, 1942 |

FOREIGN PATENTS

| Number | Country | Date |
| --- | --- | --- |
| 603,972 | France | Jan. 15, 1926 |